Figure 1:
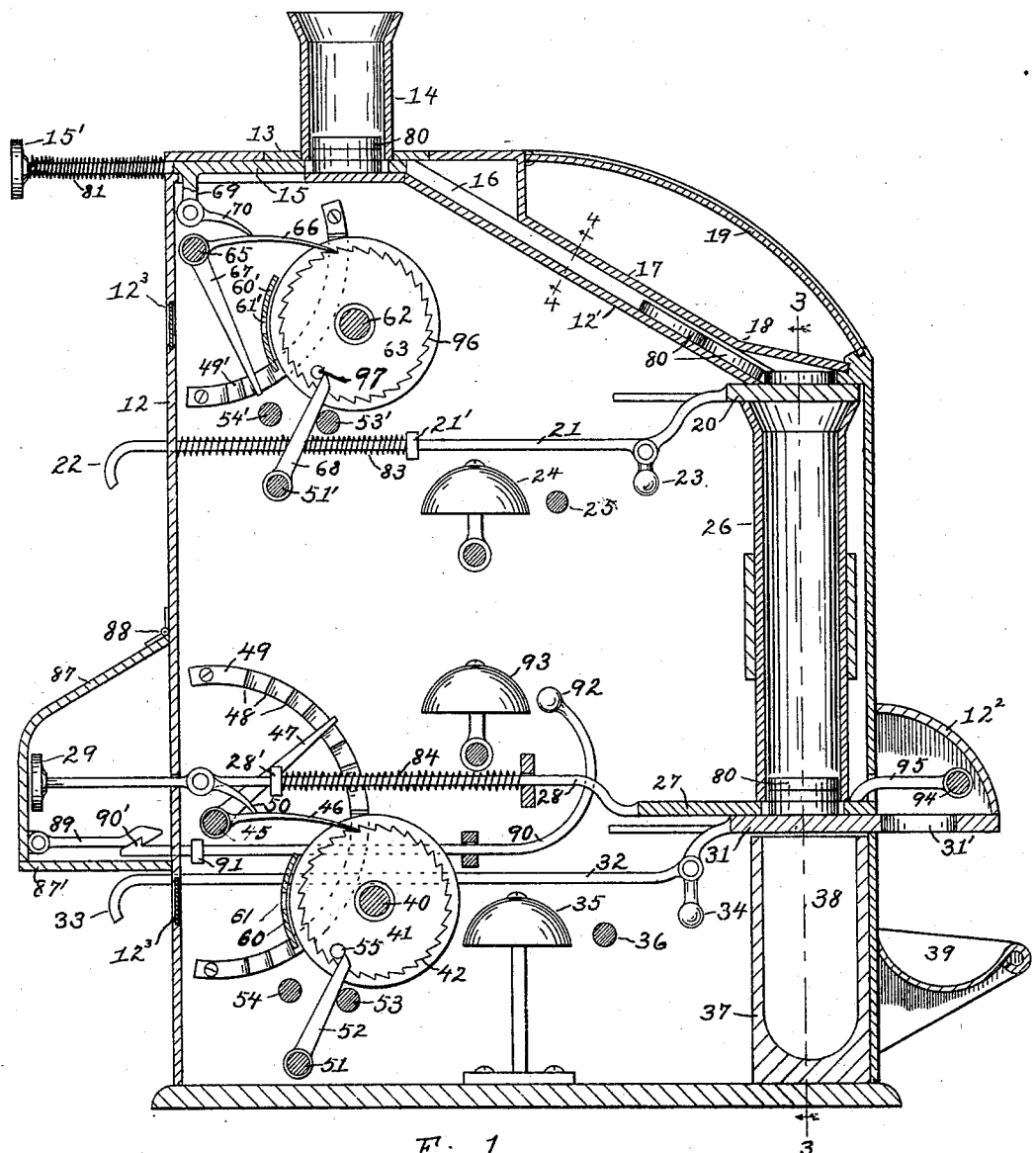

(No Model.) 6 Sheets—Sheet 1.

L. N. SHOEMAKER.
CASH RECEIVING, DELIVERING, AND REGISTERING MACHINE.

No. 545,101. Patented Aug. 27, 1895.

WITNESSES:
J. S. Arnott
A. H. Pommert

INVENTOR
Lockert N. Shoemaker,
BY
Eugene L. Arnott,
ATTORNEY.

(No Model.) 6 Sheets—Sheet 3.

L. N. SHOEMAKER.
CASH RECEIVING, DELIVERING, AND REGISTERING MACHINE.

No. 545,101. Patented Aug. 27, 1895.

WITNESSES:
INVENTOR:
Lockert N. Shoemaker,
BY
Eugene L. Arnott,
ATTORNEY.

(No Model.) 6 Sheets—Sheet 4.

L. N. SHOEMAKER.
CASH RECEIVING, DELIVERING, AND REGISTERING MACHINE.

No. 545,101. Patented Aug. 27, 1895.

WITNESSES:
J. S. Arnott
D. H. Pommert

INVENTOR
Lockert N. Shoemaker,
BY
Eugene L. Arnott,
ATTORNEY.

(No Model.) 6 Sheets—Sheet 5.

L. N. SHOEMAKER.
CASH RECEIVING, DELIVERING, AND REGISTERING MACHINE.

No. 545,101. Patented Aug. 27, 1895.

WITNESSES:
J. S. Arnott
Wm H. Pommert

INVENTOR:
Lockert N. Shoemaker,
BY Eugene L. Arnott,
ATTORNEY.

(No Model.) 6 Sheets—Sheet 6.

L. N. SHOEMAKER.
CASH RECEIVING, DELIVERING, AND REGISTERING MACHINE.

No. 545,101. Patented Aug. 27, 1895.

WITNESSES:
J. F. Arnott
Wm H. Pommert

INVENTOR:
Lockert N. Shoemaker,
BY Eugene L. Arnott,
ATTORNEY.

UNITED STATES PATENT OFFICE.

LOCKERT N. SHOEMAKER, OF GREENFIELD, OHIO.

CASH RECEIVING, DELIVERING, AND REGISTERING MACHINE.

SPECIFICATION forming part of Letters Patent No. 545,101, dated August 27, 1895.

Application filed March 30, 1892. Serial No. 427,141. (No model.)

*To all whom it may concern:*

Be it known that I, LOCKERT N. SHOEMAKER, a citizen of the United States, residing at Greenfield, in the county of Highland and State of Ohio, have invented certain new and useful Improvements in Cash Receivers and Registers, of which the following is a specification, reference being had to the accompanying drawings.

My invention relates to a new and useful cash receiving and registering machine designed for the use of storekeepers and others as a means of registering or indicating in figures the total receipts and also the total expenditures for any given period of time, as a day, for instance, and for assuring the customer, as well as the proprietor, that the amount paid has been registered by presenting to view the money received after it has been deposited in the machine by the operation of the proper mechanism.

The object of the invention is to provide a cash receiving and registering machine which will be designed, first, to receive and present to view the cash received at each sale; secondly, to mechanically add the amount of cash received to the amounts previously received and show in figures the sum of these amounts; thirdly, to mechanically add the amount of cash paid out, whether for purchases or for change, to the amounts previously paid out and show in figures the sum of these amounts, and, fourthly, to deliver to the customer the proper change or price of produce without the clerk being permitted to touch the money after it once enters the machine.

The novelty of the invention will be hereinafter fully set forth, and specifically pointed out in the claims.

Figure 2:
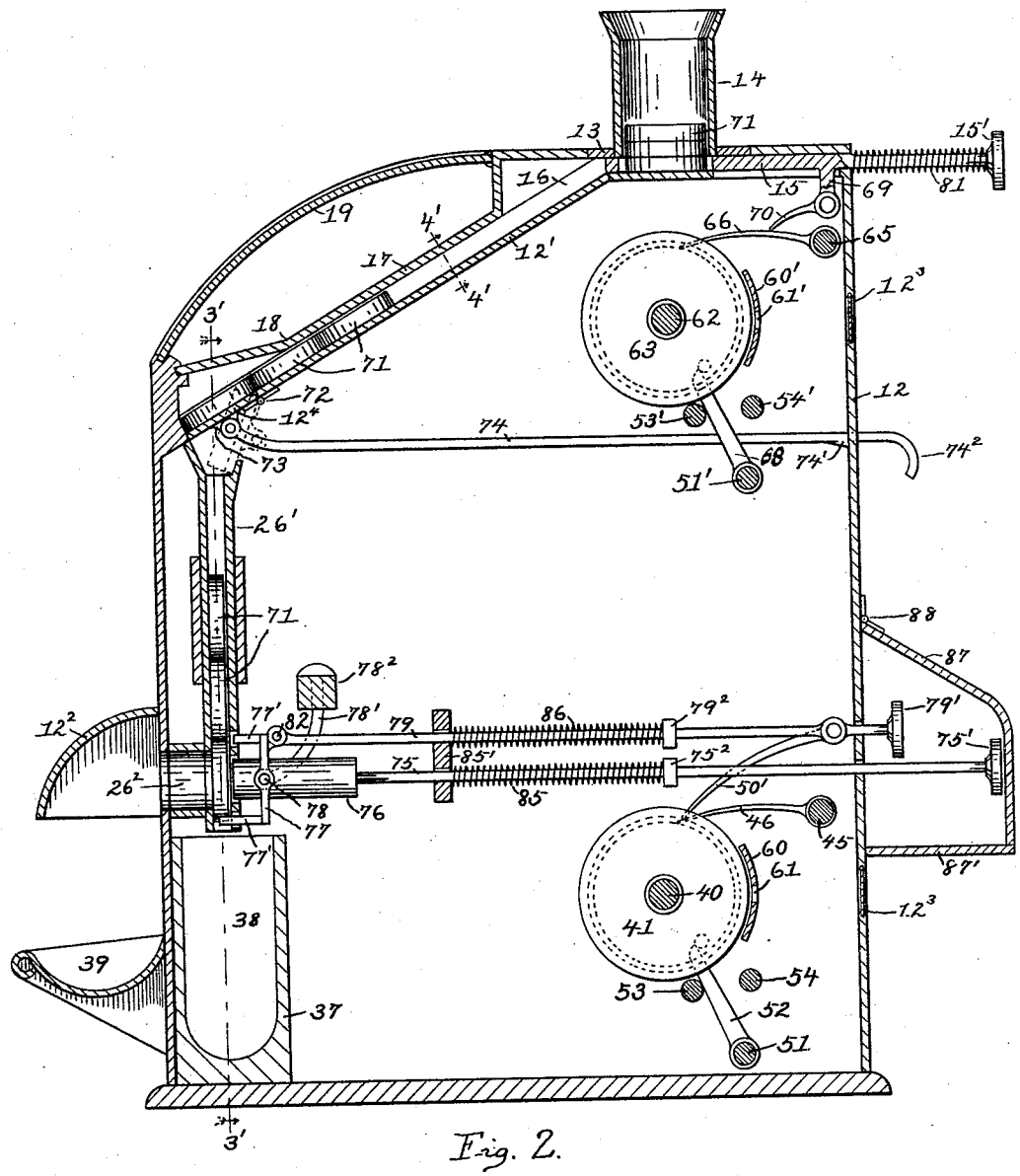
Figure 3:
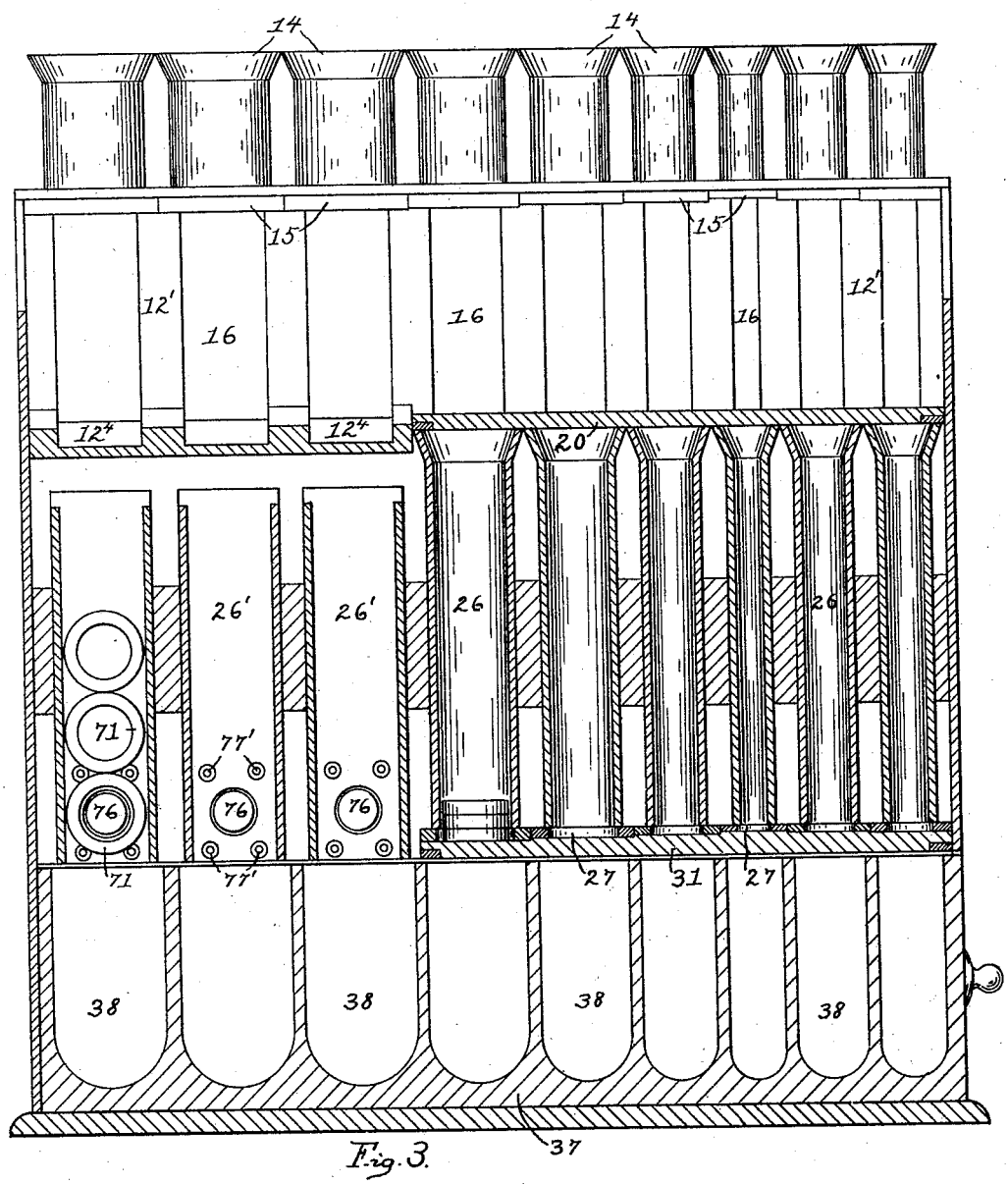
Figure 19:
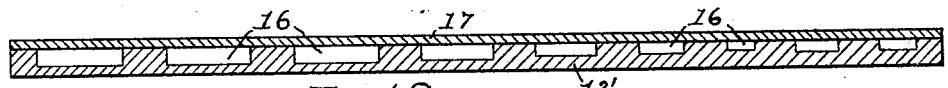
Figure 4:
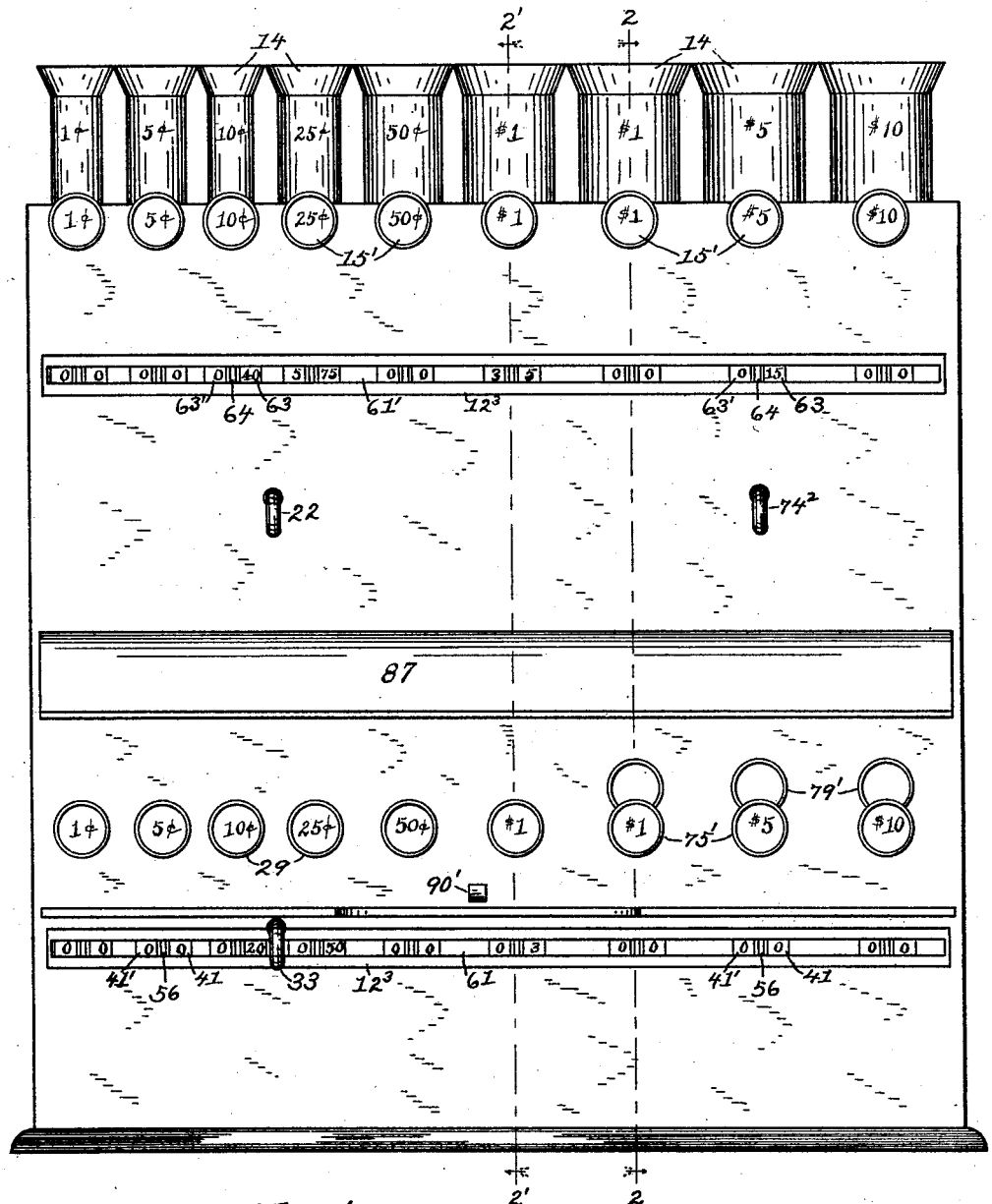
Figure 5:
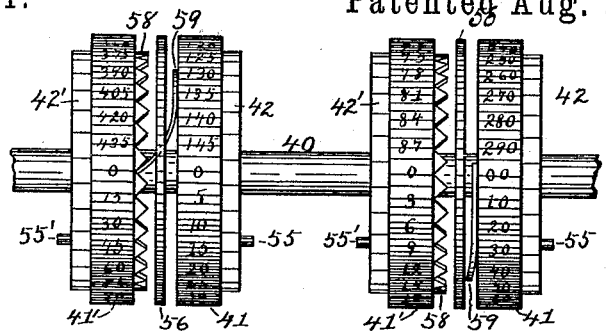
Figure 6:
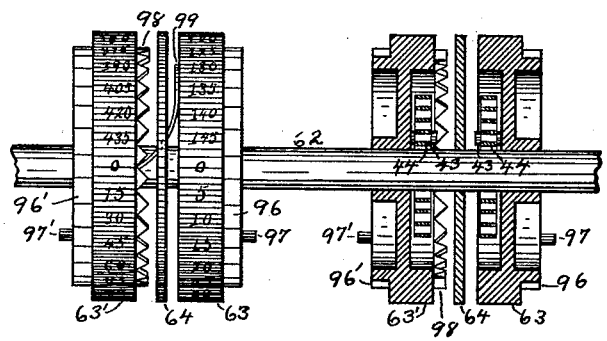
Figure 7:
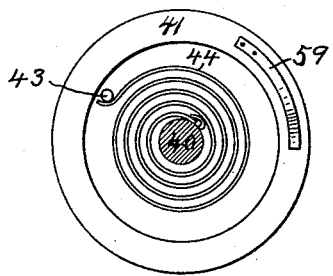
Figure 8:
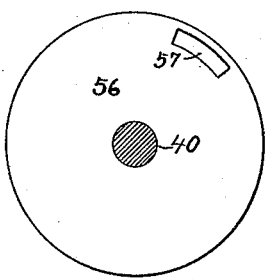
Figures 9, 10:
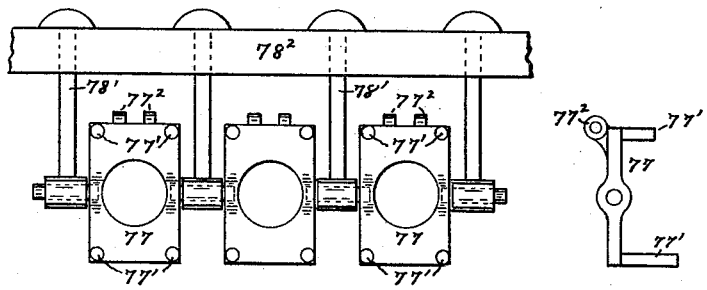
Figure 11:
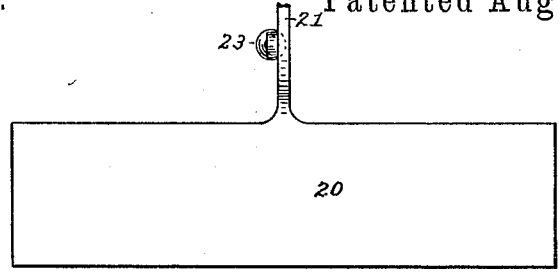
Figure 12:
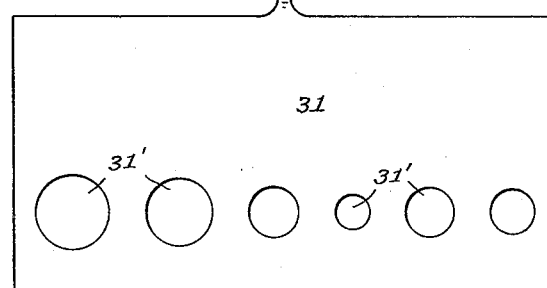
Figure 13:
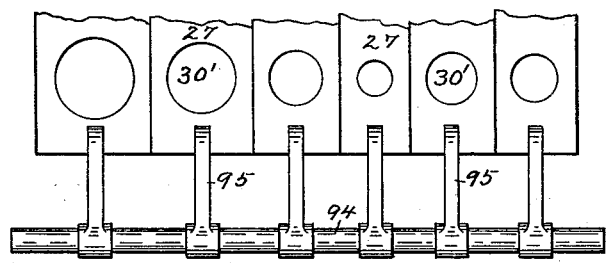
Figure 14:
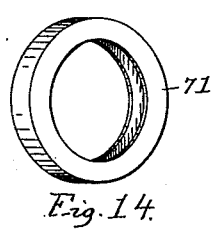
Figure 15:
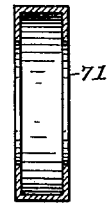
Figure 16:
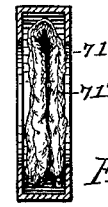
Figure 17:
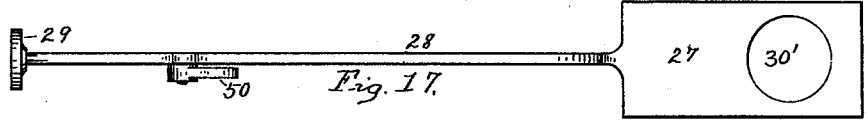
Figure 18:
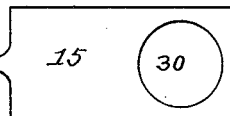

In the accompanying drawings, Figure 1 is a longitudinal vertical section of a cash receiving and registering machine embodying my invention, taken on line 2' 2' of Fig. 4 and looking in the direction of the arrows. Fig. 2 is a longitudinal vertical section taken on line 2 2 of Fig. 4 and looking in the direction of the arrows. Fig. 3 is a front elevation, partly in section, taken on line 3 3 of Fig. 1 and line 3' 3' of Fig. 2, the glass plates being removed. Fig. 4 is a rear elevation. Fig. 5 is a detail view showing two pairs of register-wheels, with a portion of their shaft. Fig. 6 is a similar view, one pair of register-wheels being sectioned. Fig. 7 is a side elevation of a register-wheel, showing the shaft in section and the retracting-spring. Fig. 8 is a side elevation of a disk. Fig. 9 is a detail showing a front view of the escapements and their supporting devices. Fig. 10 is a side elevation of one of the escapements. Fig. 11 is a top or plan view of one of the transverse slides, and Fig. 12 is a similar view of another of the transverse slides. Fig. 13 is a top or plan view of the broken ends of the slides and the pawls or locking devices resting thereon. Fig. 14 is a perspective view of one of the bill-boxes. Fig. 15 is a central vertical section of a bill-box, and Fig. 16 is a similar view of a bill-box with a bill placed therein. Fig. 17 is a top or plan view of a slide with its rod and pressure-button, and Fig. 18 is a similar view of another slide with its rod and pressure-button. Fig. 19 is a detail sectional view taken on line 4 4 of Fig. 1 and 4' 4' of Fig. 2.

The same reference-figures are used to indicate identical parts in all the views.

In the drawings, 12 designates the frame or casing of the machine. The rear part of the frame or casing may be made of glass, or windows or reading-openings $12^3$ $12^3$ may be used, in order that the register-wheels and interior coin-tubes may be visible to the operator.

On the top of the frame or casing 12 and secured in a plate 13 is a row or series of tubes 14, placed in an upright or vertical position and preferably made of glass. These tubes are designed to receive the cash, and a tube of suitable diameter is provided for each size, value, or denomination of coin used. The tube for receiving silver dollars, for instance, is considerably larger in diameter than the tube for receiving dimes. Tubes are also provided for receiving paper bills or greenbacks, as will be explained more fully later on. Under each tube 14 is a slide 15, resting upon casing 12. Each slide 15 has a circular opening 30 at a point directly beneath the corresponding tube, the diameter of the opening 30 being about equal to the interior diameter of the tube. Each slide 15 is also provided with a retracting-spring 81 and a pressure-button 15', and on said pressure-button is marked the value of the coin or bill to be operated by the slide.

The upper front part of the frame or casing 12 is made with a forward slope or incline 12', as shown most clearly in Figs. 1 and 2, and incline 12' has parallel grooves 16, one groove for each tube 14, running with uniform width and depth from the top to the bottom of the incline. These grooves are preferably rectangular in cross-section, as shown most clearly in Fig. 19, and each groove is arranged in line with a corresponding tube 14. The width of each groove is about equal to the interior diameter of the corresponding tube 14, and the depth of each groove is a little greater than the thickness of the coin or bill box to be used therein.

Over grooves 16 and resting upon the strips or ridges between the grooves is a glass plate 17. This plate is preferably jointed or slightly bent at a point 18 near the bottom of the incline in order to accommodate the coins, as will be hereinafter more fully explained. A large curved or show-case glass 19 is preferably placed over plate 17, as shown.

At the bottom of the incline 12' that part of the casing used for coins assumes a level or horizontal position, as shown in Fig. 1, and has circular openings respectively in line with and equal in width to the corresponding grooves 16. Just beneath these openings and in immediate contact with the casing is a transverse bar or slide 20, supported on suitable cleats. Slide 20 has an operating-rod 21. Rod 21 has a collar 21' and a handle 22 at the rear of the machine. The slide 20 extends across that part of the machine used for coins, as shown in Fig. 3.

Pivoted to rod 21 is a short arm or hammer 23, and immediately beneath rod 21 is a bell or gong 24. Between the arm 23 and gong 24 is a tripping-rod 25, mounted in the casing of the machine.

Beneath the slide 20 is a row or series of upright or vertical tubes 26, preferably made of glass and slightly enlarged at the top, corresponding in diameter and arrangement to tubes 14. Each of these tubes is placed immediately under and is equal in diameter to an opening at the foot of incline 12'.

Beneath each tube 26 is a slide 27, with operating-rod 28. Rod 28 has a collar 28', and a pressure-button 29, on which is marked the value of the coin to be operated by the slide. A retracting-spring 84 extends between collar 28' and a suitable transverse bar. Each slide 27 has a circular opening 30' immediately beneath and in diameter equal to the corresponding tube 26. These slides are similar in form and manner of operation to slides 15.

Beneath slide 27 is a transverse bar or slide 31, supported on suitable cleats. Slide 31 has an operating-rod 32, with handle 33 at the rear of the machine. The rod 32 carries a short pivoted arm or hammer 34, and immediately beneath the rod is a bell or gong 35.

Between the arm 34 and gong 35 is a tripping-rod 36, mounted in the casing of the machine. Slide 31, with its operating-rod, with pivoted arm and gong, is similar in form and manner of operation to slide 20, with its operating-rod, with pivoted arm and gong, with the exception that slide 31 preferably extends through casing 12, and projects somewhat in front of the casing, and has a row or series of circular openings 31', respectively in front of and equal in diameter to the tubes 26.

Beneath the slide 31 is a money till or drawer 37, which is preferably arranged to be drawn out at one side of the machine. This drawer has money pits or compartments 38 immediately beneath tubes 26 and 26', as shown most clearly in Fig. 3.

In front of the drawer 37 and outside of casing 12 is an open money-receptacle 39, extending the full width of the machine, the purpose of which will presently appear.

Upon a transverse shaft or arbor 40, secured in casing 12, a series of wheels 41 and 41' are rotatably mounted. These wheels are provided with ratchet-teeth 42 and 42' and have figures or numbers on their peripheries, one number for each ratchet-tooth. From one side of each wheel 41 and 41' a short pin or stud 43 is projected. A convolute or coiled spring 44 is provided for each wheel, and is attached at one end to arbor 40, and at the other end it has a short outward or reverse curve, which passes partly around a stud 43, as shown most clearly in Fig. 7.

A transverse shaft or rod 45, mounted in the casing 12, is provided with spring-pawls 46, one pawl for each wheel 41 and 41', and the ends of said pawls bear upon ratchet-teeth 42 and 42'. Shaft 45 is provided near one end with an arm 47, which engages with stops or ratchets 48 on plate 49, secured to the inside of casing 12. By operating arm 47, which is preferably inaccessible to any one except the proprietor, the pressure of spring-pawls 46 on ratchet-teeth 42 and 42' can be increased or diminished or entirely relieved. Each rod 28 carries a pawl 50, and the end of each pawl 50 rests upon a spring-pawl 46, for a purpose hereinafter explained.

A transverse shaft or rod 51 carries pivoted pawls or stops 52. These pawls are arranged to vibrate between two transverse rods 53 and 54. A stud 55 projects from the side of each wheel 41, and a stud 55' projects from the side of each wheel 41'. The pawls or stops 52 are arranged to allow wheels 41 and 41' to rotate freely in one direction; but they engage said studs and arrest the backward motion of said wheels when they are rotated in the opposite direction.

It may be stated here that when greenbacks or paper money is used a somewhat different arrangement is necessary in the part of the machine designed for that purpose. A round flat box 71, with a large central opening in each of its flat sides, is provided, as shown most clearly in Figs. 14, 15, and 16.

The bill or greenback is properly folded and placed in this box, as represented at 71' in Fig. 16. The box 71, containing the bill 71', is then manipulated much the same as a metallic coin. The tubes 26', which are in alignment with tubes 26, are preferably rectangular instead of round and slightly larger in size than the cross-section of box 71, and the front side of the tube extends higher than the rear side, as shown. Each tube 26' has an opening in its front side near its lower end, and a corresponding opening is provided in casing 12, and these openings receive the short tube 26², for a purpose hereinafter set forth. The casing does not assume a horizontal position at the foot of the grooved incline 12', as in the part of the machine used for coins, but said incline extends directly to the front side of tubes 26', as shown most clearly in Fig. 2. The lower part 12⁴ of the incline 12', at the side or part of the machine used for bills, is hinged at 72 and provided with a downward lug or projection 73, to which is pivoted an operating-rod 74. Rod 74 has a handle 74² and a stop 74', designed to engage with the casing of the machine and hold the rod, as well as the hinged portion 12⁴ of the incline, in a forward or normal position.

Instead of slides 27, rods 75, with heads 76, are used, and instead of transverse slide 31 escapements 77 are used. Escapements 77 are pivoted at 78 to suitable supporting-arms 78', depending from the transverse bar 78². The operating-rods 79 are pivoted at 82 to lugs 77², projected from the upper part of the escapements. The transverse bar 85' has openings or bearings for the rods 75 and 79. Rods 75 have collars 75² and pressure-buttons 75'. Rods 79 have collars 79² and pressure-buttons 79'. The pressure-buttons 75' have the values of the bills marked thereon. The retracting-spring 85 extends from bar 85' to collar 75². The retracting-spring 86 extends from bar 85' to collar 79². Springs 85 and 86 hold rods 75 and 79 in their rearward or normal positions, and return them to their normal positions after being operated. Pawls 50' are carried by rods 79, and their ends rest upon spring-pawls 46. The escapements 77 consist, preferably, of a plate with an opening in its center to receive head 76, and four arms 77', two placed at the upper edge of the plate and two at the lower edge of the plate and projected forward at right angles to the plane of the plate.

The wheels mounted on arbor 40 are arranged or associated in pairs, a wheel 41 and a wheel 41' being provided for each rod 28 and a wheel 41 and a wheel 41' being provided for each rod 79. The first or right-hand wheel of each pair (looking from the rear or reading side of the machine) is designated by 41 and the second or left-hand wheel by 41'. These wheels are so arranged that every time a rod 28 or a rod 79 is pressed forward the pawl 50 or 50' rotates the corresponding wheel 41 one notch or space, and every time wheel 41 makes one complete revolution the corresponding or adjacent wheel 41' moves one notch or space. In order to accomplish this latter result a non-rotating disk 56, equal in diameter to wheels 41 and 41' and having a slot 57, is secured upon arbor 40 between wheels 41 and 41'. Wheel 41' has an annular row of teeth 58 on the side nearest wheel 41, and wheel 41 carries a spring-dog 59, which presses against disk 56.

In the rear of wheels 41 and 41' is a plate 60, having a reading-slot 61. Only one number on any wheel 41 or 41' is visible at one time through this reading-slot.

Arbor 62 is similar to arbor 40, wheels 63 and 63' are similar to wheels 41 and 41', disks 64 are similar to disks 56, crown-teeth 98 on wheels 63' are similar to crown-teeth 58 on wheels 41', ratchet-teeth 96 and 96' on wheels 63 and 63' are similar to ratchet-teeth 42 and 42' on wheels 41 and 41', studs 97 and 97' on wheels 63 and 63' are similar to studs 55 and 55' on wheels 41 and 41', pawls or stops 68 are similar to pawls or stops 52, transverse bars 53' and 54' are similar to transverse bars 53 and 54, transverse shaft 51' is similar to transverse shaft 51, spring-pawls 66 are similar to spring-pawls 46, transverse shaft 65 is similar to transverse shaft 45, arm 67, projected from shaft 65, is similar to arm 47, projected from shaft 45, plate 49' is similar to plate 49, and plate 60', with reading-slot 61', is similar to plate 60, with reading-slot 61, and therefore it will not be necessary to describe these parts more particularly here.

Each slide 15 has a downward projection 69, and projection 69 carries a pivoted pawl 70. The end of each pawl 70 rests upon a spring-pawl 66. Pawls 70 are similar to pawls 50 and 50'.

A lid or cover 87, hinged at 88 to casing 12, fits down upon shelf 87' and serves as a protection for pressure-buttons 29, 75', and 79', and prevents said pressure-buttons from being manipulated by any unauthorized person. As a greater protection cover 87 is provided with a lock 89, (preferably a combination-lock,) which engages a catch 90' on rod 90.

Rod 90 is provided with a collar 91 and carries a hammer 92, which is designed to sound an alarm upon bell or gong 93 whenever cover 87 is slightly elevated without the proper manipulation of lock 89.

A transverse shaft or rod 94 carries a series of pawls or stops 95, one for each slide 27. The inner ends of these pawls or stops 95 rest, respectively, upon slides 27, as shown. A shield or cover 12² is placed over shaft 94 and pawls 95 and tubes 26² and extends across the front of the machine, as shown in Figs. 1 and 2.

The operation of my invention, so far as not already described, is as follows: When metallic coins are received in exchange for goods, the clerk deposits these coins in the proper tubes 14, the denomination, size, or value of each coin to be received by each tube being plainly marked thereon. The clerk then presses the corresponding button or buttons 15' and the coins are carried forward by slides 15 and allowed to slide down the corresponding grooves 16 in the incline 12' under the glass plate 17. The glass plate 17 being bent or jointed at a point 18 near the foot of the incline gives room for the first coin entering the groove to make the turn necessary to assume a horizontal position in the opening at the foot of the incline. The second coin, entering the same groove, stops with its lower edge against the first, the third (at one sale) with its lower edge against the second, and so on for as many coins as are received of the same size and value at one sale. The glass plate 17 prevents the coins from passing or overlapping one another in the grooves 16. Here the coins remain in plain view of the purchaser, as well as of the proprietor, until another sale is made. It will readily be perceived that by this arrangement no fraudulent or dishonest withholding of money is likely to be practiced by the clerk or attendant without detection. When a slide 15 is pressed forward to carry the coin to the corresponding groove in the incline 12', the downward projection 69 is also carried forward and the pawl 70 engages with the ratchet-teeth 96 on the corresponding wheel 63 and turns or rotates said wheel one tooth or space. Spring-pawl 66 raises slightly to allow the tooth upon which it rests to pass forward, and then springs down upon the next tooth and by the pressure exerted thereon prevents the wheel from rotating too far by reason of momentum, and also provides against accidental rotation. The spring-pawl 66 also prevents the wheel from turning or rotating backward. When pawl 70 has carried wheel 63 forward one tooth or space, the slide 15 has reached its extreme forward limit. Therefore pawl 70 cannot carry the wheel 63 more than one space at a time. When slide 15 is brought back to its first or normal position by means of spring 81, the pawl 70 travels upon spring-pawl 66, as shown. The object of this arrangement is to prevent pawl 70, when slide 15 is again pressed forward, from engaging with the wrong tooth, and consequently carrying or rotating wheel 63 forward more than one space. By the arrangement shown no matter how far back the pawl 70 may be drawn it will always travel forward on spring-pawl 66 and engage the proper tooth and carry the wheel forward just one space when slide 15 reaches its forward limit. In case two or more coins of the same value—for instance, three silver dollars, as illustrated at 80 in Fig. 1—are received and deposited in the proper tube 14, it will be observed that the coin first deposited is received by the opening 30 in slide 15. When the slide is pressed forward, the coin contained in the opening in said slide, or the lowest coin in the column in tube 14, is carried forward, and the next to the lowest coin rests upon the solid part of the slide. When the slide returns to its first or normal position by means of spring 81, the opening 30 in said slide comes under the second coin, or the one last resting upon the solid part of the slide, and said second coin drops by power gravitation into the opening in the slide. When the slide is again pressed forward, the third or last coin rests upon the solid part of the slide, and is held from lateral movement by the sides of the tube. When the slide returns to its first position, this last coin also drops into the opening in the slide and is carried forward by said slide. The slide is then returned to its first or normal position and is not again touched until another silver dollar is received. It will be understood that each time the slide is pressed forward the wheel 63 is rotated one tooth or space, or in the present instance three spaces in all, by means of pawl 70. The purpose in this will presently appear. When the first silver dollar is carried forward to the groove 16, it slides down and locates or lodges in the opening in the level or horizontal part of the casing at the foot of the incline. The next silver dollar carried forward also slides down and stops with its edge against the first coin. The third dollar then slides down and stops with its edge against the second dollar. These three coins, or the amount received at one sale, are allowed to remain in this position under glass cover 17 until another sale is made and are in plain view of the customer. It will be observed that no coin can reach groove 16 without the operation of slide 15 and the corresponding wheel 63. I will now describe the manner in which wheels 63 and 63' register or indicate in figures the total amount of cash received. The first number on each wheel 63, or the number which appears in the reading-slot 61' prior to the registering of any sale, is 0, or zero. The second number on any wheel 63, or the number which appears in the reading-slot 61' when the corresponding slide 15 has been pressed forward once to exhibit a coin received, indicates the value of that coin. The third number on any wheel is twice the second number, the fourth three times the second number, and so on, increasing in an arithmetical progression until the zero or starting point is again reached. For instance, on the wheel registering nickels the first number is 0, the second 5c, the third 10c, the fourth 15c, the fifth 20c, and so on, the number in the reading-slot at any time indicating the total value of nickels received. When any wheel 63 has made one complete revolution, the spring-dog 99 enters the slot in disk 64, and, engaging with the teeth 98 on the side of the adjacent and coregistering wheel 63', carries or rotates said wheel 63' one tooth or space as 0, or zero, of wheel 63 appears in the reading-slot. The second number on wheel 63', or the number appearing in the reading-slot when wheel 63' is rotated one space, as explained above, taken together with the 0 on wheel 63, indicates the total value of coins received having a given value. For instance, if each wheel 63 has thirty teeth and thirty numbers then the last number before zero on the wheel registering nickels will be twenty-nine times five, or one hundred and forty-five cents. When one more nickel is registered 0 on wheel 63 and 15 on wheel 63' will appear in the reading-slot, together indicating one hundred and fifty cents, or one dollar and fifty cents; or 1 on wheel 63' may appear in the reading-slot, showing that wheel 63 has made one complete revolution; or any other system of numbering may be used without departing from the purpose of my invention, so long as the wheels indicate the total value of cash received. It will be obvious that the slot in disk 64 corresponding to slot 57 in disk 56 is just long enough to allow the spring-dog 99 to carry or rotate wheel 63' one tooth or space, the dog being then drawn from the slot and disengaged from the teeth 98 on wheel 63' until wheel 63 has made one complete revolution. When at the close of the day or any convenient time it is desirable to reset all the wheels to zero in the reading-slot, it is only necessary to turn or rotate shaft 65 by means of its actuating-arm 67 until the ends of the spring-pawls 66 are lifted out of engagement with the ratchet-teeth 96 and 96' on wheels 63 and 63', whereupon the retracting-springs 44 will cause the wheels to rotate in a backward or contrary direction until the studs 97 and 97' strike the pivoted pawls 68, at which time zero will be shown in the reading-slot on each of the wheels. Spring-pawls 66 are then forced down upon the ratchet-teeth 96 and 96' and the wheels are again ready for operation. When any wheel 63 or 63' has made several complete revolutions, the coiled spring 44 becomes almost completely wound up. When the tension becomes too great, the hooked or curved end of the spring slips off from stud 43 and the spring unwinds perhaps two or three revolutions. When the tension is somewhat relieved, the hooked end of the spring again engages, and is arrested by stud 43, whereupon it begins to wind up again, when the wheel is rotated, as before. By this arrangement the spring never becomes completely wound up and requires no attention. The spring always has tension enough to return the wheel to zero in the reading-slot when the spring-pawls 66 are lifted out of engagement with the ratchet-teeth on wheels 63 and 63'. When the coins received at a recent sale are exhibited in the grooves of incline 12' and another sale is made, the clerk first grasps the handle 22 of rod 21 and draws back the transverse slide 20, thereby allowing all the coins exhibited to view in the grooves of incline 12' to drop from view down into the proper tubes 26. The pivoted hammer 23 passes over rod 25, and, swinging backward, sounds an alarm on bell or gong 24. The clerk then deposits the coin just received in the proper tubes 14 and presses forward the corresponding slides to carry the coins to the proper grooves in incline 12', thereby displaying them to the view of the customer. In case change is needed or money is to be paid for produce the clerk manipulates combination-lock 89, disengaging it from catch 90' on rod 90, and raises lid or cover 87. He then presses the proper button 29, thereby carrying forward the slide 27 and the coin contained in its opening 30', just as the coin was first carried forward by slide 15. The coin so carried forward drops down through opening 31' into the receptacle 39, whence it is taken by the customer, the clerk not being permitted to touch it. It will readily be perceived that in case any dishonest person not an assistant at the store should endeavor to obtain money from the machine by pressing buttons 29 he must first raise lid or cover 87. In endeavoring to do this he will bring hammer 92 into contact with gong 93 and sound the alarm. Collar 91 then engages casing 12 and prevents cover 87 from being raised so long as lock 89 retains its hold upon rod 90. Cover 87 is shown in its elevated position in Fig. 4. In case the coins in any tube 26 should all be dealt out the pawl or stop 95 will thereafter, whenever slide 27 is again pressed forward, drop into opening 30' and prevent the slide from reaching its forward limit, and consequently prevent pawl 50 from rotating wheel 41. When a coin is contained in opening 30', the end of the pawl rides over the coin and cannot drop into the opening. By this arrangement no registering is possible when no coin is dealt out. It will readily be understood that wheel 41 is turned one space by pawl 50 on rod 28 every time the slide 27 is pressed forward to deliver a coin to the customer. Therefore wheels 41 and 41' indicate the total amount of money dealt out, just as wheels 63 and 63' indicate the total amount of money received. The amount indicated on wheels 63 and 63', minus the amount indicated on wheels 41 and 41', should be equal to the value of the coins actually contained in the machine. At the close of the day or any other convenient time the proprietor grasps the handle 33 of rod 32 and draws back the transverse slide 31 until the openings 31' are brought directly under the openings in slide 27. The pivoted hammer 34 passes over rod 36 and, swinging backward, sounds an alarm on bell or gong 35. The coins contained in tubes 26 drop down into the proper pits or compartments 38 in the money till or drawer 37. The drawer 37 may then be unlocked and withdrawn from the machine and the money may be counted and compared with the amounts indicated by the register-wheels. In case of paper money or greenbacks the manner of procedure is slightly different from that just described. A bill must be properly folded and placed in a box 71, as shown at 71' in Fig. 16. The box is then placed in the proper tube 14 and carried forward by a slide 15 and exhibited in grooved incline 12', just as a metallic coin. The bill is visible through the opening in the side of box 71. When the next sale is made, the rod 74, pivoted to lug or projection 73, is drawn back, thus causing the hinged part 12⁴ of incline 12' to swing down to the position shown in dotted lines in Fig. 2. The box or boxes 71 then slide down with their edges downward into the tubes or bill-box receptacles 26', the lowest box in each tube 26' lodging upon the lower arms 77' of the escapement 77. The rod 74 is then pressed forward until the catch 74' engages the inner side of casing 12 and the hinged part 12⁴ of incline 12' assumes its normal position. When a bill is to be paid out, the rod 75 is pressed forward by means of pressure-button 75', and the head 76 passes through the openings in the sides of the box 71 and forces the bill forward through tube 26², whence it drops down into the money-receptacle 39. When the rod 75 is returned to its normal position by means of spring 85, the rod 79 is pressed forward, forcing the upper arms 77' of the escapement 77 between the two lowest boxes 71, and at the same time carrying the lower arms of the escapement backward from under the lowest box, thus allowing the empty box 71 to drop down into a compartment 38 in the money-drawer 37. When the rod 79 is pressed forward, the pawl 50, carried by said rod, moves forward upon spring-pawl 66 and engages teeth 42 of register-wheel 41 and rotates said wheel one notch or space. When the rod 79 and the escapement 77 are returned to their normal position by means of spring 86, the boxes 71, remaining in tube 26', drop down and the lowest box lodges upon the lower arms of the escapement 77, as before. The rod 75 may then be pressed forward to deal out another bill, if desired. The number of boxes 71 contained in any compartment 38 of the money-drawer 37 shows how many bills of a given corresponding value have been dealt out during the day, and this number should agree with the number registered on the corresponding wheels 41 and 41'. The wheels 63 and 63' will show the value of the bills received, just as in the case of coins.

Suitable doors may be made in the casing to gain access to the inside of the machine.

Having thus fully described my invention, what I claim as new, and desire to secure by Letters Patent, is—

1. In a cash receiving and registering machine, the combination, with a row or series of cash receiving tubes 14, of a series of slides placed respectively beneath said tubes and designed to carry forward the cash received to the view of the customer, an incline 12' in which the cash is displayed to view, said incline being placed in front of said tubes, a row or series of tubes 26 placed beneath said incline, and a series of slides placed beneath said tubes for the purpose of dealing out money to the customer, substantially as set forth.

2. In a cash receiving and registering machine, the combination, with a row or series of cash receiving tubes 14, of a series of slides placed respectively beneath said tubes and designed to carry forward the cash received to the view of the customer, an incline 12' in which the cash is displayed to view, said incline being placed in front of said tubes, a slide 20 placed beneath said incline and designed to drop the cash from view into tubes 26, a row or series of tubes 26 placed beneath said slide, and a series of slides placed beneath said tubes for the purpose of dealing out money to the customer, substantially as set forth.

3. In a cash receiving and registering machine, the combination, with a row or series of money receiving tubes 14 of a series of slides placed respectively beneath said tubes and designed to carry forward the money received to the view of the customer, a like row or series of tubes 26 and a like series of slides for dealing out money to the customer, an incline 12' in which the cash is displayed to view, and a slide 20 designed to drop the cash from view into tubes 26, and registering mechanism which indicates in figures the sum of the amounts received and also the sum of the amounts dealt out, all substantially as set forth.

4. In a cash receiving and registering machine, the combination, with a row or series of money-receiving tubes 14, of a series of slides 15 placed respectively beneath said tubes and designed to carry forward the cash received to the view of the customer, and a series of wheels 63 and 63' mounted on an arbor 62 and having numbers on their peripheries, a rod or shaft 65 having a series of spring-pawls 66 which engage with and bear upon the ratchet teeth on said wheels, and pawls 70 for rotating said wheels one tooth or space at a time, said pawls resting and traveling forward upon said spring-pawls, for the purpose set forth, and being connected to and operated in unison with said slides, the whole being so constructed and arranged that whenever a slide is pressed forward to exhibit a coin to view the corresponding wheel is rotated one space, thereby registering the value of the coin, all substantially as set forth.

5. In a cash receiving and registering machine, the combination, with a row or series of money-receiving tubes 14, of a series of slides 15 placed respectively beneath said tubes and designed to carry forward the money received to the view of the customer, and an incline 12' on which the money slides down to the foot of the incline and lodges in view of the customer, substantially as described.

6. In a cash receiving and registering machine, the combination, with a row or series of money-receiving tubes 14, of a series of slides 15 placed respectively beneath said tubes and having openings equal in diameter to said tubes, an incline in front of and having grooves respectively equal in width to said tubes, and a slide 20 immediately beneath the foot of the incline for dropping the money from the view of the customer, substantially as described.

7. In a cash receiving and registering machine, the combination, with an incline 12' having parallel grooves extending longitudinally with the machine, of a transverse slide 20 placed beneath the foot of said incline and designed to retain the coins in view of the customer, a row or series of money-receiving tubes 26 placed beneath said slide, and a series of slides placed respectively beneath said tubes for the purpose of dealing out money to the customer, substantially as set forth.

8. In a cash receiving and registering machine, the combination, with a series of slides 27 for dealing out money to the customer, of a series of stops or pawls 95 for arresting said slides when no coin is dealt out, substantially as set forth.

9. In a cash receiving and registering machine, the combination, with a series of slides 27 for dealing out money to the customer, of a series of stops or pawls 95 having their inner ends resting, respectively, upon said slides, for the purpose specified, substantially as set forth.

10. In a cash receiving and registering machine, the combination, with a row or series of money tubes 26, of a series of slides 27 placed respectively beneath said tubes and having operating rods 28 with pressure-buttons 29 and openings 30' immediately beneath said tubes, for the purpose specified, and stops 95 with their ends resting upon said slides, substantially as set forth.

11. In a cash receiving and registering machine, the combination, with a row or series of tubes 26, of a series of slides placed respectively beneath said tubes, a series of stops 95 with their ends resting upon said slides, respectively, for the purpose specified, and a money receptacle 39 placed in front of said slides, as and for the purpose set forth.

12. In a cash receiving and registering machine, the combination, with a row or series of tubes 26, of a series of slides placed respectively beneath said tubes, a transverse slide 31 beneath said slides and designed to drop the cash contained in said tubes into suitable pits or compartments 38 in the money drawer 37, a hammer 34 attached to the operating rod of said slide 31, and a bell or gong 35 to be actuated or sounded by said hammer, substantially as set forth.

13. In a cash receiving and registering machine, the combination, with a row or series of tubes 26, of a series of slides placed respectively beneath said tubes, a money receptacle 39 placed in front of said slides, a transverse slide 31 beneath said slides and designed to drop the money contained in said tubes into suitable pits or compartments 38 in the money-drawer 37, a hammer 34 attached to the operating rod of said slide 31, and a bell or gong 35 to be actuated or sounded by said hammer, substantially as described.

14. The combination, in a cash receiving and registering machine, with a row or series of cash-tubes 26, of a series of slides 27 placed beneath said tubes and having operating rods 28 which carry pawls 50, and a series of wheels 41 and 41' mounted on an arbor 40 and having numbers on their peripheries, a rod or shaft 45 having a series of spring-pawls 46 which engage with and bear upon the ratchet-teeth 42 and 42' on said wheels, and pawls 50 for rotating said wheels one tooth or space at a time, said pawls resting and traveling forward upon said spring-pawls 46, for the purpose set forth, and being connected to and operated in unison with said slides 27, the whole being so constructed and arranged that whenever a slide 27 is pressed forward to deliver a coin into receptacle 39 the corresponding wheel 41 is rotated one space, thereby registering the value of the coin delivered, substantially as set forth.

15. The combination, in a cash receiver and register, with a row or series of money tubes 26, of a series of slides 27 placed respectively beneath said tubes, a transverse slide 31 placed beneath said slides, a cash receptacle 39, a hammer attached to the operating rod of said slide 31, a bell or gong to be operated or sounded by said hammer, and a money till or drawer 37 having pits or compartments 38 immediately beneath said tubes, substantially as described.

16. In a cash receiving and registering machine, the combination, with an arbor 40 mounted in the casing of the machine, of a series of wheels 41 rotatably mounted thereon, said wheels having numbers on their peripheries and ratchet teeth designed to be engaged by pawls 50 when slides 27 are pressed forward, and a rod or shaft 45 having spring-pawls 46 which bear upon said ratchet teeth and an operating rod or arm 47 which is held in position by stops or ratchets 48 on plate 49, substantially as set forth.

17. In a cash receiving and registering machine, the combination, with an arbor 40 mounted in the casing of the machine, of a series of wheels 41 rotatably mounted thereon, said wheels having numbers on their peripheries and ratchet teeth designed to be engaged by pawls 50, rods 79 carrying pawls 50', escapements 77 operated by rods 79, substantially as set forth.

18. In a cash receiving and registering machine, the combination, with an arbor 40 mounted in the casing of the machine, of a series of wheels 41 rotatably mounted thereon, said wheels having numbers on their peripheries and ratchet teeth designed to be engaged by pawls 50 and 50', rods 28 carrying pawls 50, rods 79 carrying pawls 50', slides 27 operated by rods 28, and escapements 77 operated by rods 79, substantially as set forth.

19. In a cash receiving and registering machine, the combination, with an arbor 40 mounted in the casing of the machine, of a series of wheels 41 rotatably mounted thereon, said wheels having numbers on their peripheries and ratchet teeth designed to be engaged by pawls 50', rods 79 carrying pawls 50', escapements 77 operated by rods 79, and the series of tubes or bill-box receptacles 26', substantially as set forth.

20. In a cash receiving and registering machine, the combination, with an arbor 40 mounted in the casing of the machine, of a series of wheels 41 rotatably mounted thereon, said wheels having numbers on their peripheries and ratchet teeth designed to be engaged by pawls 50 and 50', rods 28 carrying pawls 50, rods 79 carrying pawls 50', slides 27 operated by rods 28, escapements 77 operated by rods 79, and the series of tubes 26 and 26', substantially as set forth.

21. In a cash receiver and register, the combination, with an arbor 40 mounted in the casing of the machine, of a series of wheels rotatably mounted thereon, said wheels having ratchet teeth and being associated in pairs, a non-rotating disk between the wheels of each pair, pawls 50 designed to engage said ratchet teeth, rods 28 carrying said pawls, slides 27 operated by said rods, a transverse slide 31 placed beneath said slides, and a series of tubes 26, substantially as set forth.

22. In a cash receiver and register, the combination, with an arbor 40 mounted in the casing of the machine, of a series of wheels rotatably mounted thereon, said wheels having ratchet teeth and being associated in pairs, a non-rotating disk between the wheels of each pair, pawls 50 designed to engage said ratchet teeth, rods 28 carrying said pawls, slides 27 operated by said rods, a transverse slide 31 placed beneath said slides and carrying an arm or hammer 34, and a bell or gong 35 to be sounded by said arm or hammer, substantially as set forth.

23. In a cash receiving and registering machine, the combination, with an arbor 40 mounted in the casing of the machine, of a series of wheels rotatably mounted on said arbor, and a series of disks mounted on said arbor and held against rotation, said wheels having ratchet teeth and being associated in pairs and said disks being placed respectively between the wheels of each pair, and mechanism whereby, when one wheel makes one complete revolution the other wheel of that pair rotates one tooth or space, substantially as described, pawls 50 designed to engage said ratchet teeth, rods 28 carrying pawls 50, slides 27 operated by said rods, a transverse slide 31 placed beneath said slides, a series of tubes 26, and a money-drawer or till 37 having pits or compartments 38 beneath said slides, substantially as set forth.

24. In a cash receiving and registering machine, the combination, with an arbor 40 mounted in the casing of the machine, of a series of wheels and a series of disks mounted thereon, the wheels being rotatable and associated in pairs, and the disks being held against rotation and placed respectively between the wheels of each pair, the first wheel of each pair having ratchet teeth designed to be engaged by pawl 50 on rod 28, and carrying a spring-dog 59 which presses against the adjacent disk 56, the second wheel 41' of each pair having an annular row of teeth on the side nearest to the first wheel 41, and the disk 56 having a slot 57 through which the spring-dog 59 on the first wheel 41 projects to engage with the teeth on the second wheel 41' and rotate said second wheel one tooth or space every time said first wheel makes one complete revolution, pawls 50 and 50' designed to engage the ratchet teeth of wheels 41, rods 28 and rods 79 carrying said pawls, slides 27 operated by rods 28, escapements 77 operated by rods 79, the series of tubes 26, and the money-receptacle 39, substantially as set forth.

25. In a cash receiving and registering machine, the combination, with an arbor mounted in the casing of the machine, of a series of wheels rotatably mounted thereon and having studs projecting from one side, and pawls or stops arranged to allow said wheels to rotate in one direction, but to engage with said studs and arrest rotation in the opposite direction when zero reaches the reading slot 61, and coiled springs 44 designed to rotate said wheels in a backward direction and present zero in the reading slot whenever the spring pawls 46 are lifted out of contact with ratchet teeth 42, substantially as set forth.

26. In a cash receiving and registering machine, the combination, with an arbor mounted in the casing of the machine, of a series of wheels rotatably mounted thereon, each wheel having a stud 43 projecting from one side, and a coiled spring 44 having one end secured to said arbor and the other end describing a reverse curve and hooked part of the way around said stud 43 and tempered so that when the spring becomes wound up the hooked end slips from the stud and the spring partly unwinds, thus relieving the tension, said spring being designed to rotate said wheel in a backward direction and present zero in the reading slot whenever the spring-pawls 46 are lifted out of contact with ratchet teeth 42, pawls 50 and 50' designed to engage said ratchet teeth, rods 28 and rods 79 carrying said pawls, slides 27 operated by rods 28, and escapements 77 operated by rods 79, substantially as described.

27. In a cash receiving and registering machine, the combination, with an arbor 40 mounted in the casing of the machine, and a series of wheels 41 having ratchet teeth 42 mounted thereon, of a shaft or rod 45 having a series of spring-pawls 46 secured thereto, said spring-pawls being adapted to engage with said ratchet teeth and prevent said wheels from rotating in a backward direction and also from rotating forward by accident or momentum, an arm 47 attached to said shaft or rod and designed to rotate said shaft or rod and thereby increase or diminish or entirely relieve the pressure of the spring-pawls 46 upon the ratchet teeth, and ratchets or stops 48 designed to hold said arm in any desired position, substantially as set forth.

28. In a cash receiving and registering machine, the combination, with an incline 12′ having grooves 16, a portion 12⁴ hinged at 72, and bill-boxes 71 in said grooves, of a rod 74 for operating said hinged portion, substantially as set forth.

29. In a cash receiving and registering machine, the combination, with an incline 12′ having grooves 16 designed to receive the bill boxes 71, the lower part 12⁴ of the incline being hinged as at 72, of an operating rod 74 having a shoulder or stop 74′ designed to engage with the casing of the machine and hold the rod and the hinged portion 12⁴ in their forward or normal position, substantially as set forth.

30. In a cash receiving and registering machine, the combination, with an incline 12′ designed to receive the bill boxes 71, the lower part 12⁴ of the incline being hinged and having an operating rod 74 provided with stop 74′, of a series of tubes or bill-box receptacles 26′ placed beneath the foot of said incline, substantially as set forth.

31. In a cash receiving and registering machine, the combination, with a series of tubes or bill-box receptacles 26′, of an escapement 77 for each tube or bill-box receptacle, said escapement having two upper and two lower arms projecting at right-angles to said tube or bill-box receptacle, substantially as set forth.

32. In a cash receiving and registering machine, the escapement 77 consisting substantially of a plate pivoted at the center and having two upper and two lower arms projecting at right angles to the plane of the plate, for the purpose specified, substantially as set forth.

33. In a cash receiving and registering machine, the combination, with a series of tubes or bill-box receptacles 26′, of an escapement 77 for each tube or bill box receptacle, said escapement consisting substantially of a plate pivoted at the center and having two upper and two lower arms projecting at right-angles to the plane of the plate, substantially as set forth.

34. In a cash receiving and registering machine, the combination, with a series of tubes or bill-box receptacles 26′, of an escapement 77 for each tube or bill-box receptacle, and a rod 79 by the operation of which the bill-boxes are dropped down one at a time into a compartment in money drawer 37, substantially as set forth.

35. In a cash receiving and registering machine, the combination, with a series of tubes or bill-box receptacles 26′, of an escapement 77 for each tube or bill-box receptacle, said escapement consisting substantially of a plate pivoted at the center and having two upper and two lower arms projecting at right-angles to the plane of the plate, and a rod 79 by the operation of which the bill-boxes are dropped down one at a time into a compartment in money-drawer 37, substantially as set forth.

36. In a cash receiving and registering machine, the combination, with an incline 12′ designed to receive the bill-boxes 71, the lower part of the incline being hinged and having an operating rod 74 provided with stop 74′ designed to hold the rod in its forward or normal position, a series of tubes or bill-box receptacles 26′ placed beneath the foot of said incline, of an escapement 77 for each tube or bill-box receptacle 26′, and a rod 79 by the operation of which the bill-boxes are dropped down one at a time into a compartment in money drawer 37, substantially as described.

37. In a cash receiving and registering machine, the combination, with a series of tubes or bill-box receptacles 26′, of an escapement 77 for each tube or bill-box receptacle, a rod 79 for operating said escapement and a pawl 50′ carried by said rod and engaging the ratchets of wheel 41, thereby registering the operations of escapement 77, substantially as set forth.

38. In a cash receiving and registering machine, the combination, with a series of tubes or bill-box receptacles 26′, of an escapement 77 for each tube or bill-box receptacle, said escapement consisting of a plate pivoted at the center and having two upper and two lower arms projecting at right-angles to the plane of the plate, a rod 79 for operating said escapement and a pawl 50′ carried by said rod and engaging the ratchets of wheel 41, thereby registering the operations of escapement 77, substantially as set forth.

39. In a cash receiving and registering machine, the combination, with a tube or bill-box receptacle 26′, of a rod 75 designed to force the bill from the bill-box 71 and carry it forward to the money receptacle 39, substantially as set forth.

40. In a cash receiving and registering machine, the combination, with a tube or bill-box receptacle 26′, and a bill-box 71 containing a bill or greenback placed therein, of a rod 75 designed to force the bill or greenback from the bill-box 71 and carry it forward to the money receptacle 39, substantially as set forth.

41. In a cash receiving and registering machine, the combination, with a tube or bill-box receptacle 26′, of an escapement 77, and a rod 75 designed to force the bill from the bill-box 71 and carry it forward to the money receptacle 39, substantially as described.

42. In a cash receiving and registering machine, the combination, with the casing 12, of a lid or cover 87 placed over pressure-buttons 29, a lock 89 secured to said lid or cover and engaging rod 90, a hammer 92 carried by said rod, and a bell or gong 93 to be operated or sounded by said hammer, substantially as set forth.

43. In a cash receiving and registering machine, the combination, with the casing 12, of a lid or cover 87 placed over pressure-buttons 29, a combination lock 89 secured to said cover or lid and engaging rod 90, and the collar 91 carried by rod 90 and designed to engage casing 12, substantially as set forth.

44. In a cash receiving and registering machine, the combination, with the casing 12, of a lid or cover 87 placed over pressure-buttons 29, a lock 89 secured to said lid or cover and engaging rod 90, a hammer 92 carried by said rod, a bell or gong 93 to be operated or sounded by said hammer, and the collar 91 carried by rod 90, substantially as set forth.

LOCKERT N. SHOEMAKER.

Witnesses:
GEORGE W. LANGLEY,
FRANK ANSHUTZ.